(12) United States Patent
Vagedes et al.

(10) Patent No.: US 6,536,822 B1
(45) Date of Patent: Mar. 25, 2003

(54) CARGO BED EXPANDER INCLUDING A RAMP AND METHOD OF USING THE CARGO BED EXPANDER

(75) Inventors: Joshua E. Vagedes, Ft. Recovery, OH (US); W. David Lawson, Hustonville, KY (US)

(73) Assignee: ProMax, Inc., Stanford, KY (US)

( * ) Notice: Subject to any disclaimer, the term of this patent is extended or adjusted under 35 U.S.C. 154(b) by 0 days.

(21) Appl. No.: 10/051,729

(22) Filed: Jan. 22, 2002

(51) Int. Cl.$^7$ ............................................... B62D 33/03
(52) U.S. Cl. ..................... 296/26.1; 296/26.08; 296/61; 414/537
(58) Field of Search ............................ 296/26.08, 26.09, 296/26.1, 26.11, 57.1, 61, 62; 414/537

(56) References Cited

U.S. PATENT DOCUMENTS

| | | |
|---|---|---|
| 3,158,302 A | 11/1964 | Dickerson |
| 3,724,694 A | 4/1973 | Wilson |
| 3,763,827 A | 10/1973 | Burkart |
| 3,912,098 A | 10/1975 | Nicotra |
| 3,913,811 A | 10/1975 | Spencer |
| 4,020,957 A * | 5/1977 | Wren .......................... 14/71.1 |
| 4,127,201 A * | 11/1978 | Baumann ..................... 14/69.5 |
| 4,700,421 A | 10/1987 | Gladney et al. |
| 4,813,584 A | 3/1989 | Wiley |
| 5,067,640 A | 11/1991 | Gaskill |
| 5,199,842 A | 4/1993 | Watt et al. |
| 5,395,020 A | 3/1995 | King |
| 5,462,398 A | 10/1995 | Hymer |
| 5,533,771 A * | 7/1996 | Taylor et al. .................. 108/44 |
| 5,536,058 A * | 7/1996 | Otis .............................. 296/61 |
| 5,649,732 A | 7/1997 | Jordan et al. |
| 5,674,044 A * | 10/1997 | Ranes ......................... 280/402 |
| 5,678,984 A * | 10/1997 | Petersen ..................... 14/71.7 |
| 6,076,215 A * | 6/2000 | Blankenship et al. ......... 14/69.5 |
| 6,139,247 A | 10/2000 | Wright |
| 6,250,874 B1 * | 6/2001 | Cross ........................... 296/61 |

* cited by examiner

Primary Examiner—D. Glenn Dayoan
Assistant Examiner—Patricia L. Engle
(74) Attorney, Agent, or Firm—Kenneth F. Pearce (57) ABSTRACT

A wheelless carrier coupled to the hitch of a vehicle for carrying loads and for expanding the cargo bed. The cargo bed expander is provided with at least one gate. When catched, the gate functions as a stop to prevent the cargo from falling out of the cargo bed. And when the gate is seated, it creates a ramp between the gate's seat and the cargo bed expander. The cargo bed expander is raised to about the level of the cargo bed by at least one lift, and is dimensioned to allow clearance of the vehicle's tailgate.

21 Claims, 6 Drawing Sheets

CARGO BED EXPANDER INCLUDING A RAMP AND METHOD OF USING THE CARGO BED EXPANDER

BACKGROUND OF THE INVENTION

1. Field of the Invention

In the most general sense, the present invention relates to vehicles having cargo beds and hitches, e.g., trucks and trailers. Using a hitch, the wheelless cargo carrier is coupled to the vehicle. Extending upwardly from the beam of the wheelless carrier is a lift for lifting at least one support that expands the cargo bed. One end of the cargo bed expander is provided with a hinged gate. When the gate is seated it functions as a ramp, and when the gate is catched it functions as a stop to prevent cargo from falling off the wheelless carrier. The invention is particularly useful for transporting wheeled vehicles, such as, all terrain vehicles, lawn mowers, tractors, etc. In one the preferred embodiments, the cargo bed expander is provided with a pair of supports and a pair of gates.

2. Description of the Previous Art a) U.S. Pat. No. 5,649,732-Jordan, et. al., teaches a ramp system for loading and unloading a vehicle having a cargo area where the vehicle has a trailer hitch receiver. Two ramps (14) having rungs (46) are attached to the horizontal ramp support bar (30) that is affixed to the L-shaped fiances (18) connected to hitch receiver (12). Each of the ramps (14) is mounted to the ramp support bar (30) on either side of the vertical member of ramp support (10). Each ramp (14) is mounted to bar (30) by aligning O-rings (50). When ramps (14) are lowered they form an inclined path to the cargo bed.

b) U.S. Pat. No. 5,067,640-Gaskill describes a spaced apart beam universal wheelless carrier. The '640 first support beam (42) extends directly rearward from the towing vehicle and is sandwiched between bifurcations of second support beam (44). Pivots (60) are provided so that when transporting a personal water craft, platforms (50) are free to pivot so that they align themselves with the hull of the personal water craft. Gaskill further teaches that motorcycle platform (48) and personal water craft platforms (50) are mounted to the bifurcations of second support beam (44).

c) U.S. Pat. No. 3,158,302-Dickerson enables a luggage carrier attached to the rear of a motor vehicle. Two tubes (22) are used to attach the Dickerson rectangular luggage carrier frame to the motor vehicle.

d) U.S. Pat. No. 5,395,020-King discloses a wheel chair carrier (12) mounted at the rear of a motor vehicle. Tongue (62) engages hitch (64). Support tube (68) is attached to tongue (62). Tube (62) is provided with transverse frame member (72) and hollow tube (68) is provided with transverse member (76), wherein the frame members support the King container.

e) U.S. Pat. No. 3,763,827-Burkart enables a livestock loading chute. Forward end (36) abuts the rear end (38) of the truck bed (12.) The rear end (40) of ramp (18) is adapted to rest on the ground. Ramp (18) is retained in the loading position by twin support members (42) pivotally mounted by any conventional means (44), such as a bolt, at each side of ramp (18.) Support members (42) are in turn retained in track (46) while track (46) is mounted on the lower surface of the bed (12) by conventional means.

f) U.S. Pat. No. 5,199,842-Watt et. al., describes a wheelchair carrier attached to a motor vehicle. A rectangular support frame (16) is pivotally mounted to connector (70) by hinge (84). Connector (70) is coupled to hitch bar (78) by a conventional nut and bolt.

g) U.S. Pat. No. 6,139,247-Wright enables a tiltable hauling device. The carrying rack (30) is hinged to frame (22) that is insertable into a hitch of the motor vehicle.

h) U.S. Pat. No. 3,913,811-Spencer describes a rectangular foldable utility platform carrier that is attached to a trailer hitch. L-shaped vertical support members are attached to main structural support member (7) while sleeve (6) connects to hitch (2) of motor vehicle.

i) U.S. Pat. No. 4,813,584-Wiley enables a detachable cargo carrier. The engagement means (24) includes a bar extending along the platform (20). Wiley's platform (20) is attached to bar (31) by welds (23), and bar (31) can be attached directly to engaging portion (28) for engaging the trailer hitch (14). Bar (31) can support platform (20), and an offset member is sometimes disposed between the engaging portion (28) and bar (31). In the preferred embodiment, a support rod (60) is attached to the underside of the engaging portion is utilized to reduce road shock on the carrier (10).

j) U.S. Pat. No. 3,724,694-Wilson discloses a wheelless trailer for use in conjunction with a standard motor vehicle ball hitch.

k) U.S. Pat. No. 5,462,398-Hymer teaches a motorcycle carrier attached to the hitch of a motor vehicle. The Hymer carrier can also act as a ramp for loading or unloading the motorcycle.

l) U.S. Pat. No. 3,912,098-Nicotra enables a container and a pivotable carrier for motorcycles.

m) U.S. Pat. No. 4,700,421-Gladney, et. al., discloses a flexible ramp for loading small vehicles into a pickup truck.

SUMMARY OF THE INVENTION

Unlike traditional motor vehicle wheeled trailers, the present apparatus and the method of using the apparatus is directed toward a wheelless carrier. In particular, a wheelless carrier that can carry loads of up to 400 Kilograms. The wheelless carrier's beam can be coupled to the vehicle's hitch in a cantilevered configuration. Extending upwardly from the beam is at least one lift for raising the support above the support beam. However, select preferred embodiments include two distinct lifts of varying heights that angle the support. Further, each lift can include a crossbeam mounted at its upper border. Such configurations allow for more than one support to be incorporated into the wheelless carrier. Gates are hinged to the supports at ends distal from the cargo bed. Catches secure the gates in their closed positions to create stops. Opening and seating the gates creates ramps to their respective supports.

An object of the present invention is to provide a method of controlling the accessibility of a vehicle's cargo bed.

It is another object of the present invention to enable a method of controlling egress and ingress of a wheeled vehicle to and from the vehicle's cargo bed.

Still another object of the present invention is to provide a wheelless carrier for use with a vehicle.

Yet another object of the present invention is to provide a wheelless carrier for use with a motor vehicle.

Still another object of the present invention is to provide a wheelless carrier including a gate mounted at an end of the cargo bed expander.

Yet still another object of the present invention is provide a wheelless carrier having more than one support.

It is yet another object of the present invention to provide a wheelless carrier that elevates the supports about the wheelless carrier's beam.

Still another object of the present invention is provide a wheelless carrier where the seating of the gates functions to create ramps to the cargo bed expander of the wheelless carrier.

Yet still another object of the present invention is to provide a wheelless carrier for transporting wheeled vehicles.

It is yet another object of the present invention to provide a wheelless carrier for transporting motorized wheeled vehicles.

Yet another object of the present invention is to provide a wheelless carrier for transporting loads of up to 400 Kilograms.

It is yet another object of the present invention to provide a wheelless carrier including at least two lifts of varying heights rising above the wheelless carrier's beam for angling the support or supports.

Still another object of the present invention is to provide a wheelless carrier having crossbeams mounted to the lifts.

An embodiment of the present invention can be described as wheelless carrier, comprising: a cantilevered beam coupled to a hitch, wherein the beam extends rearward of the hitch; a static lift extending upwardly from the beam; a cargo bed expander mounted at an upper border of the static lift further having a side proximal to the cargo bed and an edge distal from the cargo bed; a hinge proximate to the distal edge of said cargo bed expander; a gate fastened about the hinge; and a catch for preventing the gate from pivoting about the hinge, when the stop gate is closed.

Another embodiment of the present apparatus can be described as a wheelless carrier, comprising: a beam coupled to a hitch, wherein the beam extends rearward of the hitch; a first static lift extending upwardly from the beam; a second static lift extending upwardly from the beam; a cargo bed expander mounted at an upper border of the first static lift and an upper border the second static lift, wherein the cargo bed expander further includes a side proximal to the cargo bed, and an edge distal from the cargo bed; a hinge proximate to the distal edge of the cargo bed expander; a gate fastened about the hinge; and a catch for preventing the gate from pivoting about the hinge.

Yet another embodiment of the present device can be described as a wheelless carrier, comprising: a beam coupled to a hitch and extending rearward; a first lift extending upwardly At from the beam; a second lift extending upwardly from the beam; a crossbeam mounted at an upper border of the first lift; a cargo bed expander mounted about an upper border of the crossbeam and an upper border of said second lift, wherein the cargo bed expander further includes a side proximal to the cargo bed and an edge distal from the cargo bed; a hinge proximate to the distal edge of the cargo bed expander; and a gate fastened about the hinge.

In still another embodiment, the present invention can be described as a wheelless carrier, comprising: a beam coupled to a hitch and extending rearward; a first lift extending upwardly from the beam; a second lift extending upwardly from the beam; a first crossbeam mounted about an upper border of the first lift; a second crossbeam mounted about an upper border of the second lift; a cargo bed expander mounted about an upper border of the first crossbeam and the second crossbeam, wherein the cargo bed expander further comprises: a first support, including: a side proximal to the cargo bed, an edge distal from the cargo bed, a first hinge proximate to the distal edge of the first support; and a first gate fastened about the first hinge; and a second support, including: a side proximal to the cargo bed; and an edge distal from the cargo bed.

Yet still another embodiment can be described as a method of controlling accessibility to a cargo bed of a vehicle, comprising the steps of: coupling a beam to a hitch and extending the beam rearward from the hitch beyond the cargo bed; upwardly extending first and second lifts from the beam; mounting a cargo bed expander about the upper borders of the first and second lifts; hinging a gate about the distal edge of the cargo bed expander; and rotating the gate about the distal edge to a stopped position, wherein the stopped position can be seated or catched, or any position there between, to control the accessibility to the cargo bed.

It is the novel and unique interaction of these simple elements which creates the apparatus and methods, within the ambit of the present invention. Pursuant to Title 35 of the United States Code, descriptions of preferred embodiments follow. However, it is to be understood that the best mode descriptions do not limit the scope of the present invention.

DESCRIPTION OF THE PREFERRED EMBODIMENTS

Although the disclosure hereof is detailed to enable those skilled in the art to practice the invention, the embodiments published herein merely exemplify the present invention.

Figure 1:
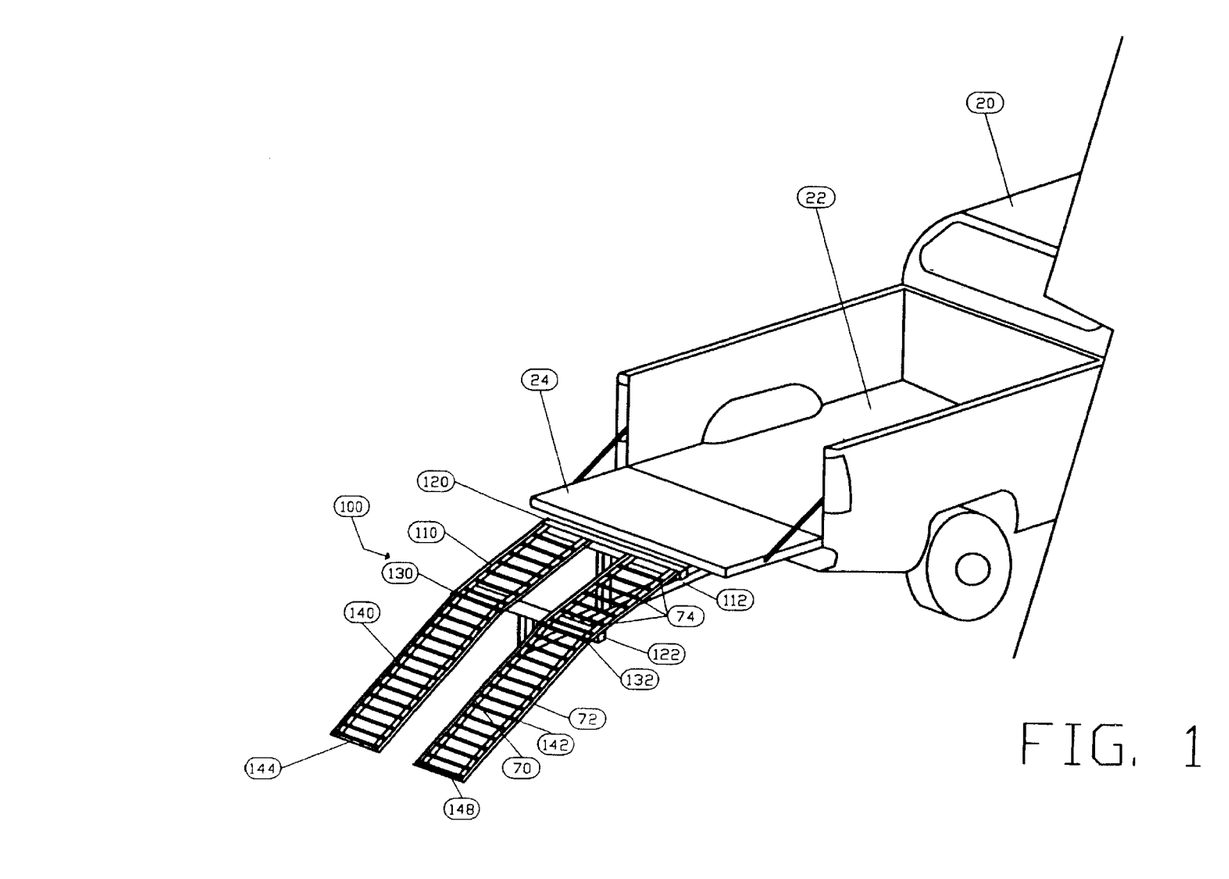
FIG. 1 is a lateral pictorial of an embodiment, within the scope of the present invention.

FIG. 1 depicts one embodiment of the present invention. Vehicle (20) has cargo bed (22) and tail gate (24). Wheelless carrier (100) is coupled to hitch (not shown). As shown, wheelless carrier (100) includes first support (110) mounted to first crossbeam (120) and second crossbeam (122) and second support (112) also mounted to first and second crossbeams (120) and (122). First hinge (130) attached to first support (110) is distal from cargo bed (22), and second hinge (132) attached to second support (112) is also distal from cargo bed (22). First gate (140) is secured to first hinge (130) and second gate (142) is fastened to second hinge (132). When distal end (144) of first gate (140) is seated on any footings, e.g., rock, topsoil, concrete or blacktop, first gate (140) creates a ramp to first support (110). And in a similar fashion, when distal end (148) of second gate is seated, second gate (142) creates a ramp to second support (112).

Figure 2:
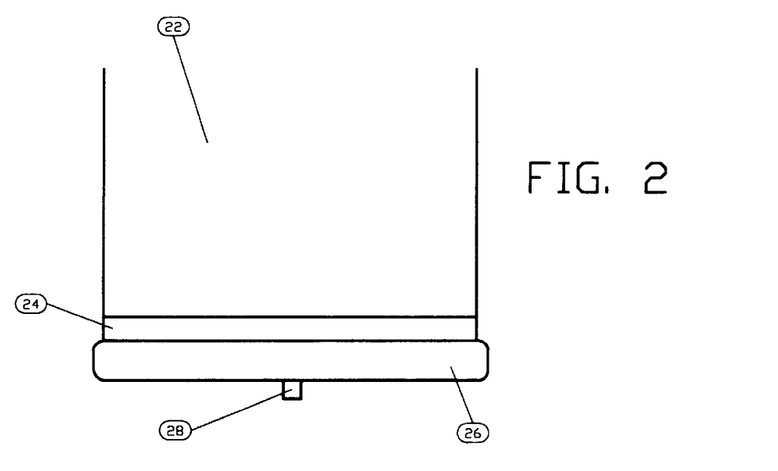
FIG. 2 is a rear view of the vehicle including a hitch.

FIG. 2 is a rear view of a motor vehicle (20) having cargo bay (22). Using any acceptable manner in the art, hitch (28) is mounted below bumper (26), tailgate (24) and cargo bed (22). As shown, hitch (28) is a drop hitch. However, those skilled in the art recognize that other hitches of sufficient strength parameters can be utilized to couple wheelless carrier (100) to hitch (28).

Figure 3:
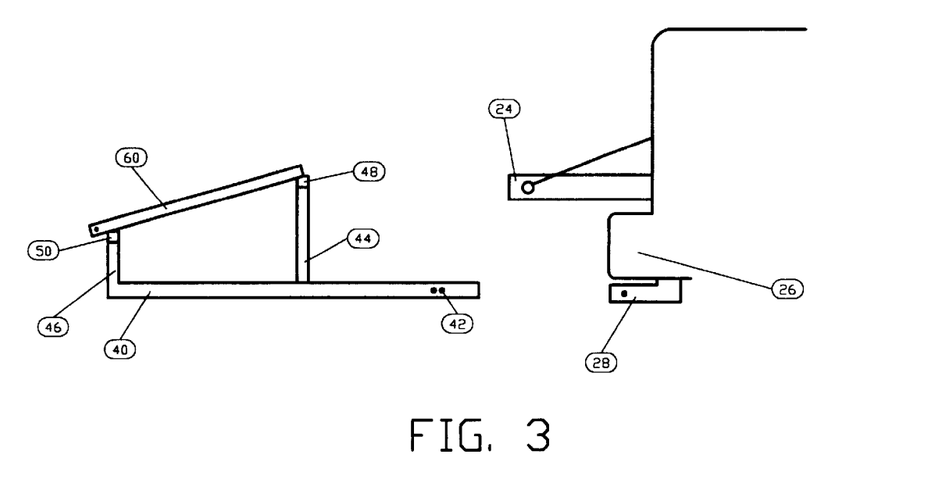
FIG. 3 is a lateral view of a support, within the ambit of the present invention.

A lateral view of one embodiment of cargo bed expander (110) of wheelless carrier (100) is portrayed in FIG. 3. Beam (40) includes apertures (42), e.g., a hole for use with a pin and a clip, for use in coupling beam (40) to hitch (28). As shown, when beam (40) is coupled to hitch (28), a cantilevered structure is created. First lift (44) extends upward from beam (40) and is proximal to hitch (28). Second lift (46) extends upward from beam (40) and is distal from cargo bed (22). As depicted in this embodiment beam (40) is provided with two static lifts (44 and 46), and it has been unexpectedly determined heights of at least 32 centimeters or first lift (44) and at least 13 centimeter; for second lift (46) function exceptionally well within the scope of the current invention. However, those skilled in the art recognize that a single static lift (44) can also lift cargo bed expander (110), or that first lift (44) and second lift (46) can be of different heights than those previously identified. Additionally, rather than being fully rigid, lifts (44 and 46) can also be constructed to have an elastic-rebounding capacity for absorbing road vibrations while vehicle (20) is moving.

In the FIG. 3 embodiment, bed expander (110) of wheelless carrier (100) includes only a single support (60). Further, bed expander (110) is angled. However, those skilled in the art understand that a horizontally level support (60) or cargo bed expander (110) will function, in accordance with the present invention. As depicted, wheelless carrier (100) is dimensioned to allow clearance for tailgate (24) of motor vehicle (20). For the single lift embodiment, first lift (44) can be provided with an angled upper border (48) to assist the incline of support (60). And as shown, second lift (46) is also provided with an angled upper border (58).

Figure 4:
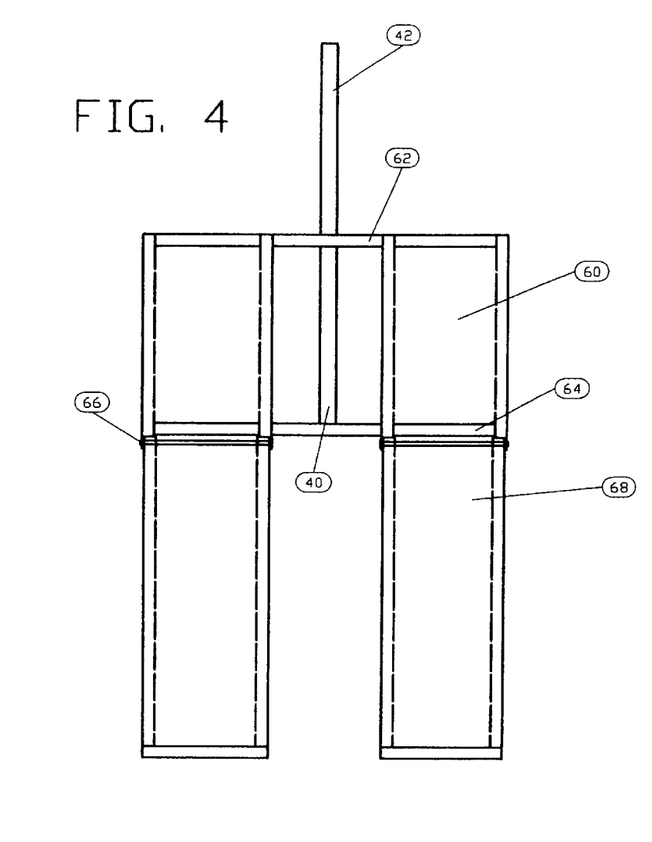
FIG. 4 is a cutaway top view of a wheelless carrier.

FIG. 4 is a cutaway top view of another embodiment of wheelless carrier (100). As shown, support (60) or cargo bed expander (110) is solid rather than grated. Cargo bed expander (110) is attached to first crossbeam (62) and second crossbeam (64). First crossbeam (62) is elevated by first lift (not shown) mounted to beam (40), and second crossbeam (64) elevated by second lift (not shown) mounted to beam (40). As depicted, gate (68) is solid rather than grated and is connected to support (60) or cargo bed expander (110) by hinge (66). When gate (68) is sealed, a ramp to support (60) is created. Although not shown, those skilled in the art would recognize that as with the embodiment disclosed in FIG. 3, the upper borders of first and second crossbeams (62 and 64) can have their upper borders angled to assist in inclining support (60). Moreover, a single crossbeam, e.g. (62) is within the scope of the present invention.

Figure 5:
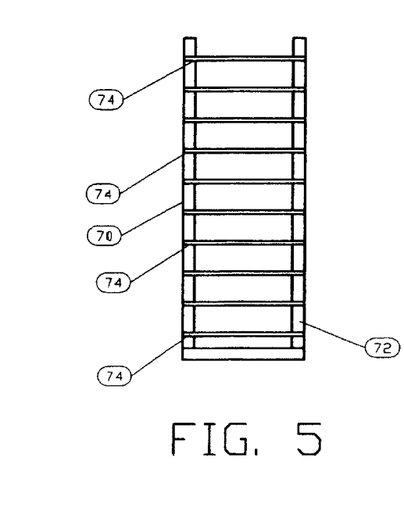
FIG. 5 is a plan view of an embodiment of a gate or a support, within the scope of the present invention.

Turning to FIGS. 1 and 5, a structural embodiment of cargo bed expanders (110, 112) and/or gates (140, 142) of wheelless carriers (100), within the scope of the present invention is enabled. Pluralities of crosspieces (74) are connected to first sidepieces (70) and second sidepieces (72) to form cargo bed expanders (110, 112) and/or gates (140, 142).

Figure 6:
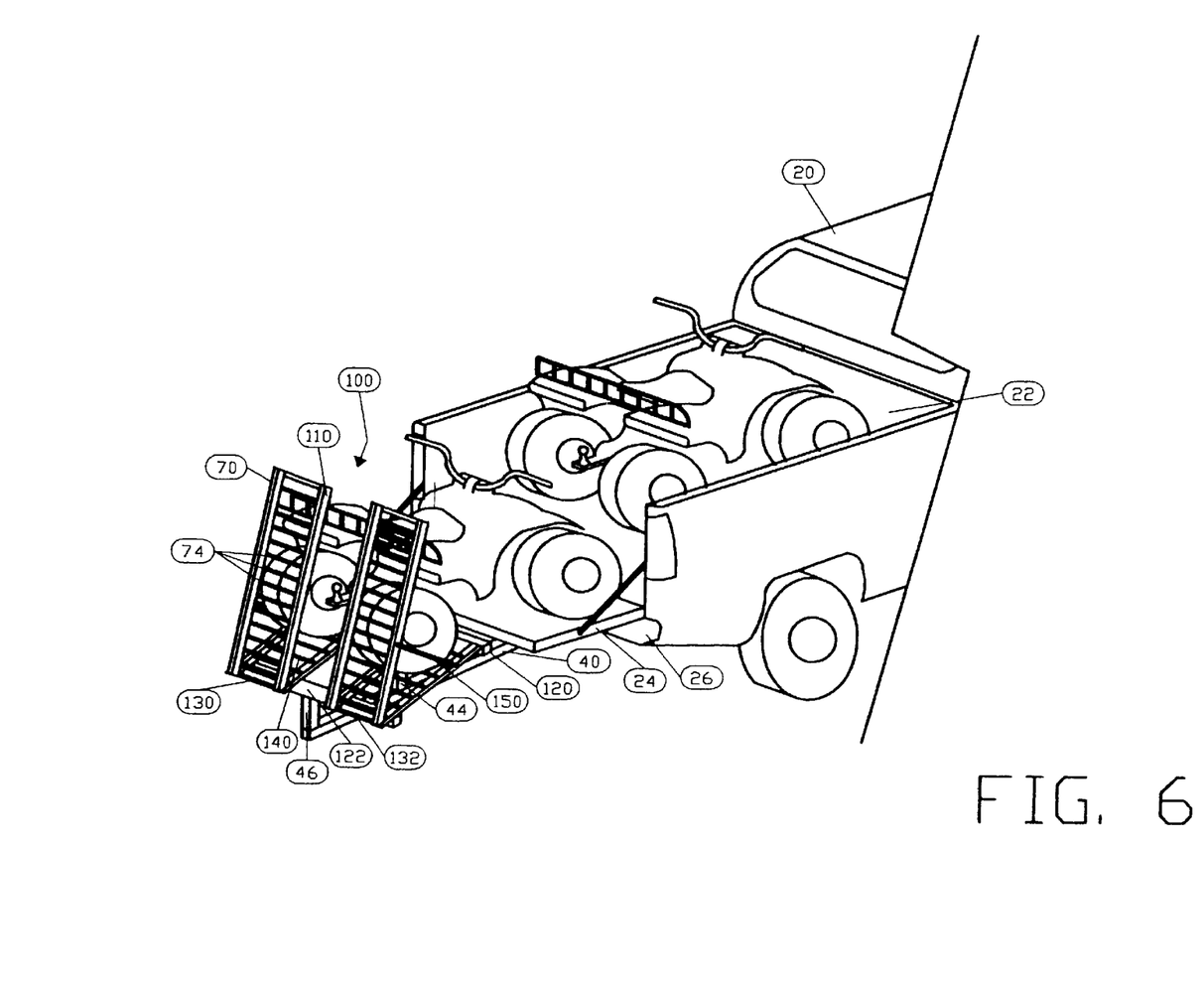
FIG. 6 is a lateral view of a wheelless carrier where the gates have been catched.
Figure 7:
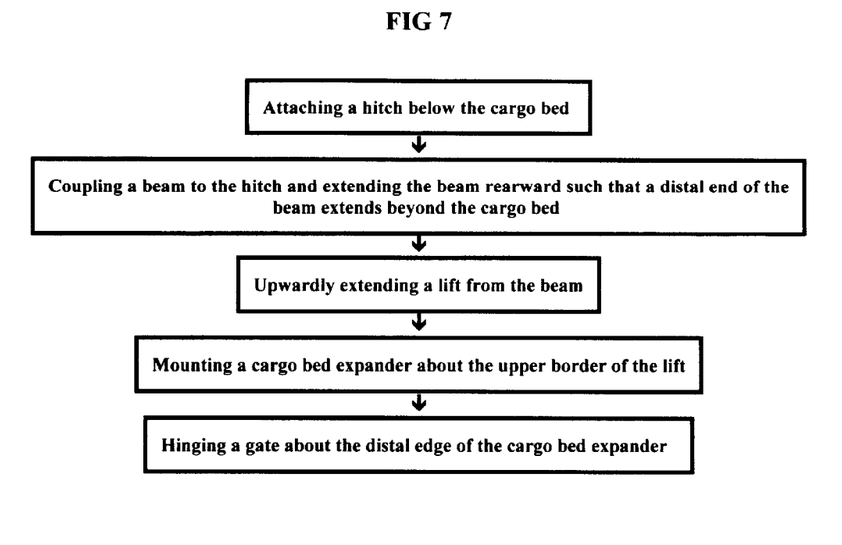
FIG. 7 is an illustration of the steps of an embodiment of the present method.
Figure 8:
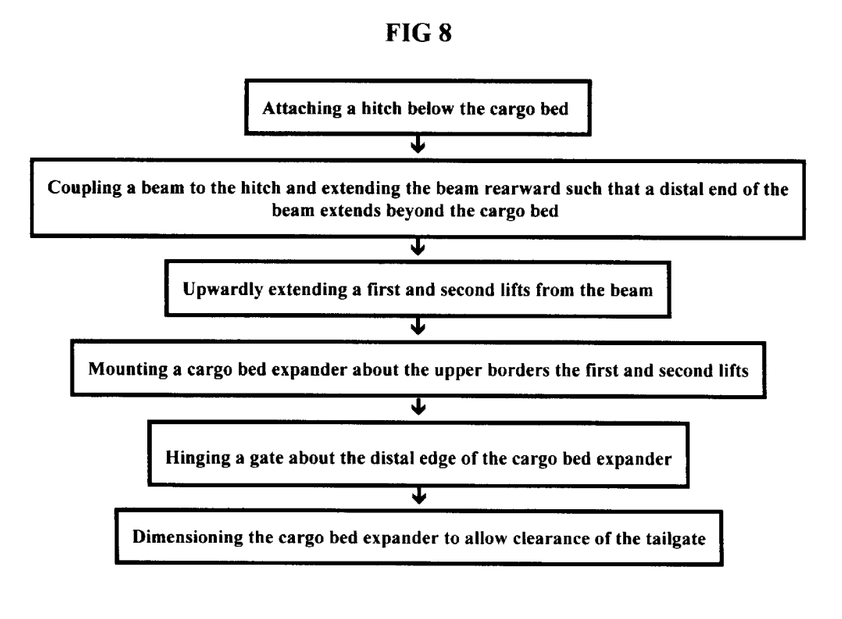
FIG. 8 is a depiction of the steps of another embodiment of the present invention.
Figure 9:
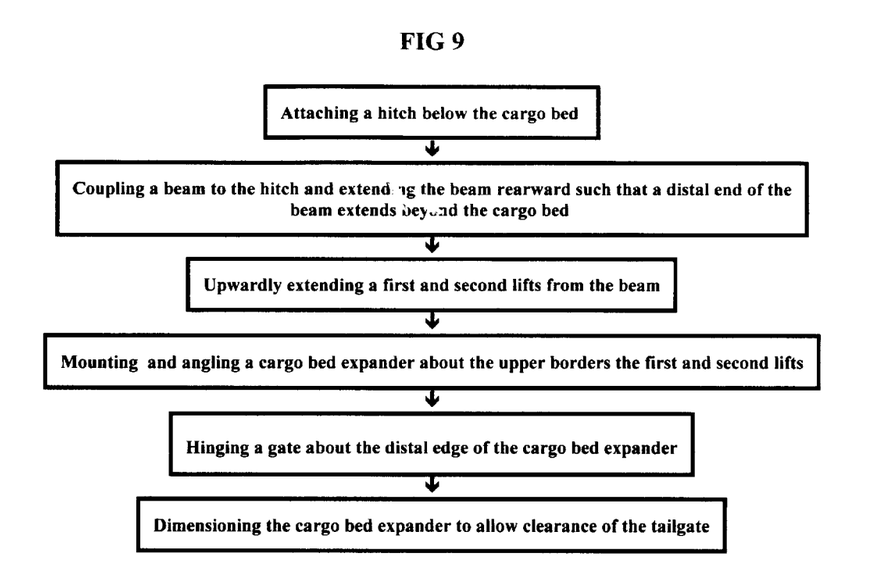
FIG. 9 is an exemplification of the steps of yet another embodiment of the current method.
Figure 10:
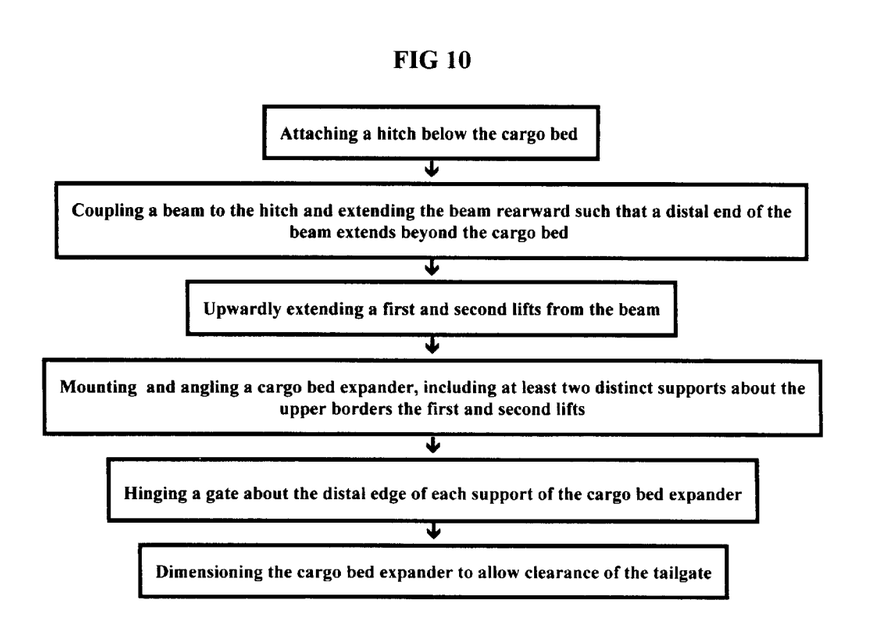
FIG. 10 is a diagrammatic representation of the steps of still another embodiment of the present invention.

In FIG. 6, an operational view of a catched embodiment of the present invention is set forth. By utilizing wheelless carrier (100), cargo bed (22) of vehicle (20) has been extended such that two all terrain vehicles rather than one may be hauled by vehicle (20). Beam (40) is coupled to the hitch (not shown) of vehicle (20). The hitch is positioned below cargo bed (22), and beam (40) extends reward. First lift (44) and second lift (46) are carried by beam (40) and extend upwardly. First crossbeam (120) is mounted to an upper edge of first lift (44) and second crossbeam (122) is attached to an upper edge of second lift (46). First support (110) including a plurality of crosspieces (74) and sidepieces (70 and 72) is mounted to first crossbeam (120) and second crossbeam (122). Second support (112) including another plurality of crosspieces (74) and side pieces (70 and 72) is mounted to first crossbeam (120) and second cross beam (122). Gate (140) is attached to first support (110) by hinge (130) while gate (142) is coupled to second support (112) by hinge (132). As shown, gates (140 and 142) like supports (110 and 112) are configured using the combination of pluralities of cross pieces (74) and sidepieces (70 and 72). In this specific embodiment, when gate (142) is catched via catch (150), gate (142) functions as a stop. As shown, catch (150) is a latch, but those skilled in the art understand that other devices can also catch gate (142).

Within the ambit of the present invention, select steps of the method of using a wheelless carrier are profiled and enabled in FIGS. 6–10. Utilization of the present invention allows wheelless carrier (100) to control accessibility of cargo bed (22). As shown in FIGS. 1 and 6, gates (140 and 142) can be seated in a stopped position by rotation downward from a catched or stopped position. Conversely, gates (140 and 142) can be rotated upward to any stopped position between the seated and the catched position. Thus, those skilled in the art recognize that the rotation of gates (140 and 142) to stopped positions controls the ingress and egress of wheeled vehicles about cargo bed (22).

Having disclosed the invention as required by Title 35 of the United States Code, Applicants now pray respectfully that Letters Patent be granted for their invention in accordance with the scope of the claims appended hereto.

What is claimed is:

1. In combination with a vehicle having a cargo bed and a hitch attached to said vehicle, wherein said hitch is positioned lower than said cargo bed, a wheelless carrier, comprising:
   a) a cantilevered beam coupled to said hitch, wherein said cantilevered beam extends rearward of said hitch and said cargo bed;
   b) a static lift extending upwardly from said beam;
   c) a cargo bed expander mounted at an upper border of said static lift further including:
      i) a side proximal to said cargo bed; and
      ii) an edge distal from said cargo bed;
   d) a hinge proximate to said distal edge of said cargo bed expander;
   e) a gate fastened about said hinge:
      i) for creating a ramp for cargo, when said gate is seated; or
      ii) for creating a stop gate for preventing said cargo from falling off of said cargo bed expander, when said stop gate is closed; and
   f) a catch for preventing said stop gate from pivoting about said hinge, when said stop gate is closed.

2. The invention of claim 1 further comprising an angling of said upper border of said static lift.

3. The invention of claim 2 wherein said bed expander's distal edge rests against said cantilevered beam.

4. The invention of claim 3 wherein said static lift extends upwardly from said cantilevered beam for at least 32 centimeters.

5. In combination with a vehicle having a cargo bed and a hitch attached to said vehicle, wherein said hitch is positioned lower than said cargo bed, a wheelless carrier, comprising:
   a) a beam coupled to said hitch, wherein said beam extends rearward of said hitch and said cargo bed;
   b) a first static lift extending upwardly from said beam;
   c) a second static lift extending upwardly from said beam;
   d) a cargo bed expander mounted at an upper border of said first static lift and an upper border of said second static lift, wherein said cargo bed expander further includes:

i) a side proximal to said cargo bed; and
ii) an edge distal from said cargo bed;
e) a hinge proximate to said distal edge of said cargo bed expander;
f) a gate fastened about said hinge:
   i) for creating a ramp for cargo, when said gate is seated; or
   ii) for creating a stop gate for preventing said cargo from falling off of said cargo bed expander, when said stop gate is closed; and
g) a catch for preventing said gate from pivoting about said hinge.

6. The invention of claim 5 wherein said first static lift extends upwardly above said beam for a greater distance than said second static lift extends upwardly from said beam.

7. The invention of claim 6 wherein said second static lift is at least 13 centimeters.

8. In combination with a vehicle having a cargo bed and a hitch attached to said vehicle, wherein said hitch is positioned lower than said cargo bed, a wheelless carrier, comprising:
a) a beam coupled to said hitch and extending rearward from said hitch and said cargo bed;
b) a first lift extending upwardly from said beam;
c) a second lift extending upwardly from said beam;
d) a crossbeam mounted at an upper border of said first lift;
e) a cargo bed expander mounted about an upper border of said crossbeam and an upper border of said second lift, wherein said cargo bed expander further includes:
   i) a side proximal to said cargo bed; and
   ii) an edge distal from said cargo bed;
f) a hinge proximate to said distal edge of said cargo bed expander; and
g) a gate fastened about said hinge.

9. The invention of claim 8 further comprising a catch for preventing said gate from pivoting about said hinge.

10. The invention of claim 9 wherein a union of said crossbeam and said first lift extends upwardly above said support beam for a greater distance than said second lift extends upwardly from said support beam.

11. The invention of claim 10 wherein said wheelless carrier is dimensioned for providing clearance for a tailgate of said vehicle to open or close.

12. In combination with a vehicle having a cargo bed and a hitch attached to said vehicle, wherein said hitch is positioned lower than said cargo bed, a wheelless carrier, comprising:
a) a beam coupled to said hitch and extending rearward from said hitch;
b) a first lift extending upwardly from said beam;
c) a second lift extending upwardly from said beam;
d) a first crossbeam mounted about an upper border of said first lift;
e) a second crossbeam mounted about an upper border of said second lift;
f) a cargo bed expander mounted about an upper border of said first crossbeam and said second crossbeam, wherein said cargo bed expander further comprises:
   i) a first support, including:
      a side proximal to said cargo bed;
      an edge distal from said cargo bed;
      a first hinge proximate to said distal edge of said first support; and
      a first gate fastened about said first hinge; and
   ii) a second support, including:
      a side proximal to said cargo bed; and
      an edge distal from said cargo bed.

13. The invention of claim 12 wherein said first support further comprises a first catch for preventing said first gate from pivoting about said first hinge.

14. The invention of claim 13 wherein said second support further comprises:
a) a second hinge proximate to said distal edge of said second support; and
b) a second gate fastened about said second hinge.

15. The invention of claim 14 wherein said second support further comprises a second catch for preventing said second gate from pivoting about said second hinge.

16. The invention of claim 15 wherein a union of said first crossbeam and said first lift extends upwardly above said beam for a greater distance than a unity of said second lift and said second crossbeam extends upwardly from said beam.

17. The invention of claim 16 wherein said unity of said second lift and said second crossbeam extends upwardly at least 13 centimeters.

18. The invention of claim 17 wherein said wheelless carrier is dimensioned for providing clearance for a tailgate of said vehicle to open or close.

19. A method of controlling accessibility of a wheeled vehicle's egress or ingress to a cargo bed of a vehicle, comprising the steps of:
a) attaching a hitch below said cargo bed;
b) coupling a beam to said hitch and extending rearward said beam from said hitch such that a distal end of said beam extends beyond said cargo bed;
c) upwardly extending a first lift from said beam;
d) upwardly extending a second lift from said beam;
e) mounting a cargo bed expander about and an upper border of said first lift and said second lift, wherein said cargo bed expander has a side proximal to said cargo bed and an edge distal from said cargo bed;
f) hinging a gate about said distal edge of said cargo bed expander; and
g) rotating said gate about said distal edge of said cargo bed expander to a stopped position to control accessibility, wherein said gate is rotated between a seated and catched by position.

20. The method of claim 18 further comprising the step of angling said cargo bed expander.

21. The method of claim 20 further comprising the step of dimensioning said wheelless carrier to provide clearance of said vehicle's tailgate.

* * * * *